United States Patent
Ramanujam et al.

(10) Patent No.: US 10,164,906 B1
(45) Date of Patent: Dec. 25, 2018

(54) SCALABLE SWITCH FABRIC CELL REORDERING

(71) Applicant: Juniper Networks, Inc., Sunnyvale, CA (US)

(72) Inventors: Rohit Sunkam Ramanujam, Sunnyvale, CA (US); Deepak Goel, Sunnyvale, CA (US); Sarin Thomas, Sunnyvale, CA (US); Sudhir Pandey, Bangalore (IN); Arghajit Basu, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 347 days.

(21) Appl. No.: 14/871,669

(22) Filed: Sep. 30, 2015

(51) Int. Cl.
*H04L 12/933* (2013.01)
*H04L 12/861* (2013.01)
*H04L 12/935* (2013.01)
*H04L 12/801* (2013.01)

(52) U.S. Cl.
CPC .......... *H04L 49/1515* (2013.01); *H04L 47/18* (2013.01); *H04L 49/30* (2013.01); *H04L 49/90* (2013.01)

(58) Field of Classification Search
CPC ..... H04L 49/1515; H04L 74/18; H04L 49/30; H04L 49/90
See application file for complete search history.

(56) References Cited

U.S. PATENT DOCUMENTS

| | | | |
|---|---|---|---|
| 5,612,863 A * | 3/1997 | De Lange | G06F 15/17 345/502 |
| 7,102,999 B1 | 9/2006 | Sindhu et al. | |
| 2002/0089926 A1* | 7/2002 | Kloth | H04L 1/22 370/220 |
| 2008/0044181 A1 | 2/2008 | Sindhu | |
| 2016/0337725 A1* | 11/2016 | Graves | H04Q 11/0005 |

* cited by examiner

*Primary Examiner* — Rhonda L Murphy
(74) *Attorney, Agent, or Firm* — Shumaker & Sieffert, P.A.

(57) ABSTRACT

In some examples, a switching system includes a plurality of fabric endpoints and a multi-stage switching fabric. A fabric endpoint of the system is configured to receive, via the switch fabric, a plurality of cell streams, wherein each cell of a cell stream of the plurality of cell stream is associated with a sequence number that defines a correct ordering of cells of the cell stream; assign subsequences of each cell stream of the plurality of cell streams to respective reorder engines of the fabric endpoint; concurrently reorder the assigned respective subsequences to produce respective ordered subsequences for the subsequences, wherein the ordered subsequences are ordered according to the correct ordering of the corresponding cell stream; interleave the respective ordered subsequences for each cell stream to produce reordered cell streams each having correctly ordered cells; and process each reordered cell stream according to the corresponding correct ordering of cells.

26 Claims, 6 Drawing Sheets

SCALABLE SWITCH FABRIC CELL REORDERING

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of types of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays packets across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

A switch fabric switches packets among multiple fabric endpoints. Typically, each fabric endpoint is able to use the switch fabric to reach and send packets to any other fabric endpoint connected to the switch fabric. In some examples, fabric endpoints exchange data units known as "cells," with each cell having a sequence number that defines a position of the cell in a sequence of cells. Because different paths through the switch fabric from a source endpoint to a destination endpoint may have different latencies, a destination fabric endpoint may receive cells sent by a particular source fabric endpoint out of order. That is, the destination fabric endpoint may receive, from the source endpoint, a cell having a first sequence number and then subsequently receive an additional cell having a second sequence number that defines a position of the additional cell that is prior to the position of the earlier-received cell (e.g., the second sequence number is lower than the first sequence number).

SUMMARY

In general, techniques are described for scalable reordering of fabric cells in a network device that employs a multi-stage switch fabric to switch data units among multiple fabric endpoints of the network device. In some examples, a fabric endpoint receives discrete data units known as "cells," with each cell having a sequence number that defines a position of the cell in a sequence of cells. Cells issued by a source fabric endpoint may be received at a destination fabric endpoint out of order and prior to processing the cell data, therefore, the destination fabric endpoint uses the sequence numbers to reorder the cells according to the sequence.

The techniques may include separately re-ordering, by a fabric endpoint, different subsequences of a sequence of fabric cells received by the fabric endpoint using respective, independent reordering engines of the fabric endpoint, and subsequently interleaving the reordered subsequences in order to generate the correctly ordered sequence such that the cells match the order in which they were sent from the source fabric endpoint. The multiple reordering engines for each fabric endpoint may each reorder subsequences for multiple different cell streams, with each cell stream sourced by a different fabric endpoint. Accordingly in some examples, each reorder engine of a fabric endpoint may manage separate reorder data structures for each source fabric endpoint that sends cells to the fabric endpoint. For instance, each reorder engine of the reorder engines for the fabric endpoint may manage per-fabric endpoint queues used by the reorder engine to reorder the subsequence of cells for the stream sequence of cells received from respective fabric endpoints. Each reorder engine operates on the reorder data structures that it manages in order to correctly reorder the subsequence of cells therein. The multiple reorder engines can operate in parallel to concurrently reorder the subsequences.

The fabric endpoint includes an interleaver module that selects a number of correctly-ordered cells from any of the reorder data structures to pass to downstream modules of the fabric endpoint for processing. The number of cells may be selected in order to meet a memory bandwidth of fabric endpoint, e.g., 2 cells per memory cycle. The interleaver module identifies those reorder engines having reorder data structures that are 'ready' with the next cell in their subsequence, i.e., reorder engines in which the expected next cell in the respective subsequences have been received and are correctly ordered in the reorder data structures according to the sequence numbers. In some examples, the interleaver module uses reorder ready data structures that specify, for each reorder data structure per-reorder engine, whether the reorder data structure is ready. The interleaver module may then select the number of correctly-ordered cells from ready reorder data structures and pass the selected cells to downstream modules of the fabric endpoint for processing.

The scalable fabric cell reordering techniques described herein may provide one or more advantages. For example, because the multiple reorder engines can concurrently reorder subsequences, the techniques may improve the throughput of the reordering functionality of each fabric endpoint, which enables the fabric endpoints to handle a higher fabric bandwidth. In some examples, the fabric bandwidth may provide for an enqueue rate to a destination fabric endpoint that exceeds one cell per memory cycle. Using multiple reorder engine to concurrently reorder respective subsequences of cell streams may also facilitate reordering at a rate sufficient to handle the enqueue rate of multiple cells per memory cycle. Further in some examples, by using dynamically allocated data structures with a pool of memory resources sharable among multiple reorder contexts for respective cell streams, the techniques may permit relatively higher resource utilization by cell reorderings requiring relatively larger windows, which may lead to better resource utilization overall and potential reduction in memory costs to the network device.

In some examples, a method of reordering cells switched by a multi-stage switch fabric having a plurality of stages to switch cells between any of a plurality of fabric endpoints comprises receiving, by a fabric endpoint of the plurality of fabric endpoints and via the switch fabric, a plurality of cell streams, wherein each cell of a cell stream of the plurality of cell stream is associated with a sequence number that defines a correct ordering of cells of the cell stream; assigning, by the fabric endpoint, subsequences of each cell stream of the plurality of cell streams to respective reorder engines of the fabric endpoint; concurrently reordering, by the reorder engines, the assigned respective subsequences to produce respective ordered subsequences for the subsequences, wherein the ordered subsequences are ordered according to the correct ordering of the corresponding cell stream; interleaving, by the fabric endpoint, the respective ordered subsequences for each cell stream to produce reordered cell streams each having correctly ordered cells; and processing, by the fabric endpoint, each reordered cell stream according to the corresponding correct ordering of cells.

In some examples, a method of reordering data units switched by a multi-stage switch fabric having a plurality of stages to switch data units between any of a plurality of fabric endpoints comprises sending, by a first fabric endpoint of the plurality of fabric endpoints to a second fabric endpoint of the plurality of fabric endpoints and via the switch fabric, a plurality of data units in a first order; receiving, by the second fabric endpoint, the plurality of data units in a second order, the second order different than the first order; separately reordering, by the second fabric endpoint, a plurality of subsequences of the plurality of data units, each subsequence of the plurality of subsequences including a different subsequence of the data units according to the second order, to produce respective ordered subsequences each ordered according to the first order; and interleaving, by the second fabric endpoint, the ordered subsequences to process the plurality of data units in the first order.

In some examples, a switching system comprises a plurality of fabric endpoints; and a multi-stage switching fabric having at least one fabric plane each having a plurality of stages to switch cells between any of the plurality of fabric endpoints. A fabric endpoint of the fabric endpoints is configured to receive, via the switch fabric, a plurality of cell streams, wherein each cell of a cell stream of the plurality of cell stream is associated with a sequence number that defines a correct ordering of cells of the cell stream; assign, by the fabric endpoint, subsequences of each cell stream of the plurality of cell streams to respective reorder engines of the fabric endpoint, the reorder engines configured to concurrently reorder the assigned respective subsequences to produce respective ordered subsequences for the subsequences, wherein the ordered subsequences are ordered according to the correct ordering of the corresponding cell stream; interleave the respective ordered subsequences for each cell stream to produce reordered cell streams each having correctly ordered cells; and process each reordered cell stream according to the corresponding correct ordering of cells.

In some examples, switching system comprises a plurality of fabric endpoints; and a multi-stage switching fabric having at least one fabric plane each having a plurality of stages to switch data units between any of the plurality of fabric endpoints. A first fabric endpoint of the fabric endpoints is configured to send, to a second fabric endpoint of the plurality of fabric endpoints and via the switch fabric, a plurality of data units in a first order. The second fabric endpoint is configured to receive the plurality of data units in a second order, the second order different than the first order; separately reorder a plurality of subsequences of the plurality of data units, each subsequence of the plurality of subsequences including a different subsequence of the data units according to the second order, to produce respective ordered subsequences each ordered according to the first order; and interleave the ordered subsequences to process the plurality of data units in the first order.

In some examples, a non-transitory computer-readable medium comprises instructions for causing at least one programmable processor of a fabric endpoint of a plurality of fabric endpoints that are coupled to a multi-stage switch fabric, to: receive, via the switch fabric, a plurality of cell streams, wherein each cell of a cell stream of the plurality of cell stream is associated with a sequence number that defines a correct ordering of cells of the cell stream; assign subsequences of each cell stream of the plurality of cell streams to respective reorder engines of the fabric endpoint; concurrently reorder the assigned respective subsequences to produce respective ordered subsequences for the subsequences, wherein the ordered subsequences are ordered according to the correct ordering of the corresponding cell stream; interleave the respective ordered subsequences for each cell stream to produce reordered cell streams each having correctly ordered cells; and process each reordered cell stream according to the corresponding correct ordering of cells.

In some examples, a non-transitory computer-readable medium comprises instructions for causing at least one programmable processor of a first fabric endpoint of a plurality of fabric endpoints that are coupled to a multi-stage switch fabric, to: send, to a second fabric endpoint of the plurality of fabric endpoints and via the switch fabric, a plurality of data units in a first order, receive the plurality of data units in a second order, the second order different than the first order; separately reorder a plurality of subsequences of the plurality of data units, each subsequence of the plurality of subsequences including a different subsequence of the data units according to the second order, to produce respective ordered subsequences each ordered according to the first order; and interleave the ordered subsequences to process the plurality of data units in the first order.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
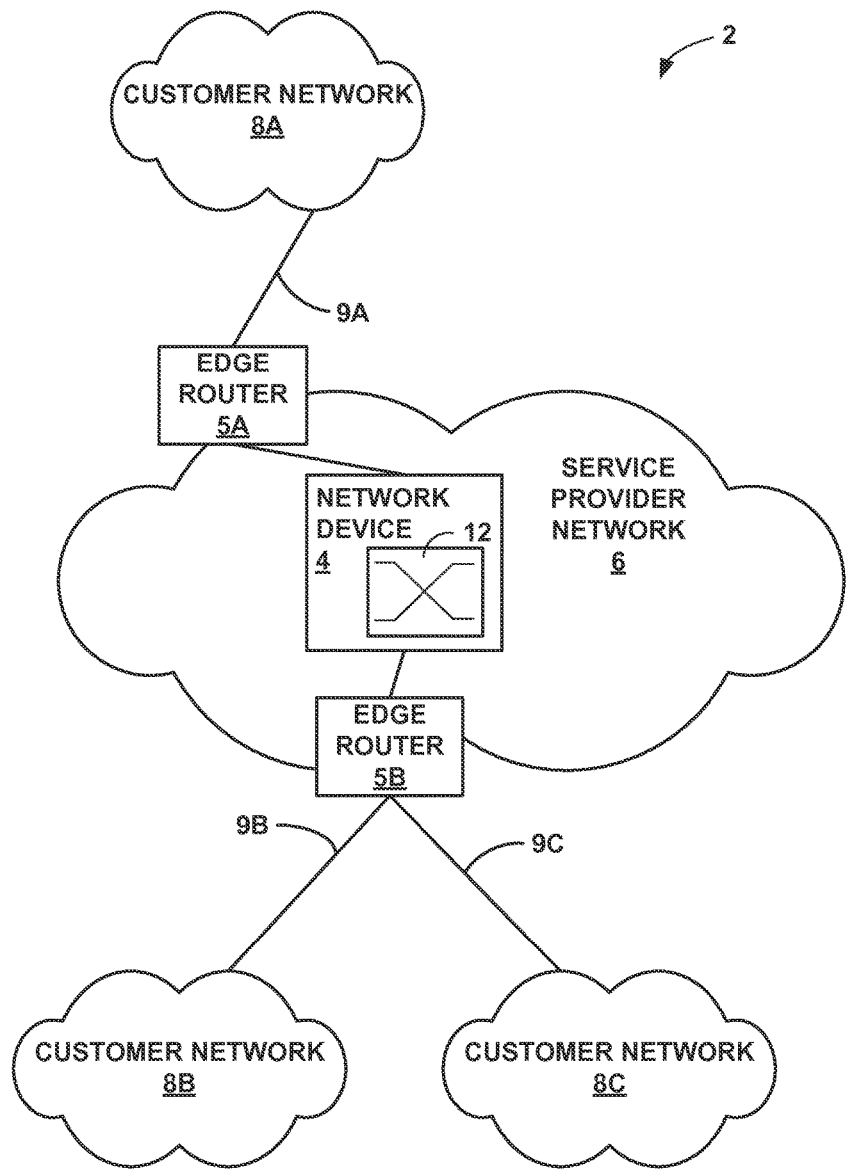
FIG. 1 is a block diagram illustrating an example network environment in which a service provider network includes a network device configured to perform fabric reordering in accordance with techniques described in this disclosure.

FIG. 1 is a block diagram illustrating an example network environment in which a service provider network includes a network device configured to perform fabric reordering in accordance with techniques described in this disclosure. For purposes of example, the principles of the invention are described with respect to a simplified network environment 2 of FIG. 1 in which network device 4 communicates with edge routers 5A and 5B ("edge routers 5") to provide customer networks 8A-8C ("customer networks 8") with access to service provider network 6. Network device 4 may represent a router that exchanges routing information with edge routers 5 in order to maintain an accurate representation of the topology of network environment 2. Network device 4 may consist of a plurality of cooperative routing components operating as a single node within service provider network 6. Network device 4 may alternatively represent an L2 and/or L3 switch, or any other device that includes an internal switching fabric for internally switching packets among fabric endpoints of the device.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than network device 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of network device 4, including customer/enterprise networks, transport networks, aggregation or access networks, and so forth.

Network device 4 may include multiple chassis (not shown in FIG. 1) that are physically coupled and configured to operate as a single router. In such examples and to edge routers 5 of network environment 2, network device 4 appears as a single routing device. For example, although network device 4 may include a plurality of chassis, from the perspective of peer routers 5, network device 4 has one or more unified host network addresses and maintains single peer routing sessions for each routing protocol maintaining peer routing sessions with each of the edge routers 5. Additional details regarding an example of a multi-chassis router having a multi-stage switch fabric are found in Pradeep S. Sindhu, U.S. Patent Publ. No. 2008/0044181 A1, entitled "Multi-chassis router with multiplexed optical interconnects" and published Feb. 21, 2008, which is incorporated by reference in its entirety.

As described in further detail below, network device 4 forwards packets, i.e., network traffic, on a data plane of network device 4 using an internal multi-stage switch fabric 12 that interconnects fabric endpoints within the network device, the fabric endpoints themselves connected to network interface cards (e.g., port interface cards) of the network device. In other words, fabric endpoints in communication with the network interfaces switch packets to one another via the switch fabric 12. In the example of FIG. 1, the multi-stage switch fabric 12 switches data units from source fabric endpoints in communication with ingress ports of the network interface cards to the destination fabric endpoints in communication with egress ports of the network interface cards to perform high-speed packet forwarding among the forwarding units of the network device 4. Multi-stage switch fabric 12 may represent a 3-stage Clos network, a 5-stage Clos network, or an n-stage Clos network for any value of n. Fabric endpoints can be a source fabric endpoint for a given packet and a destination fabric endpoint for another given packet.

In general, fabric endpoints divide packets received at an ingress port into one or more fixed-length cells for switching. However, in some instances packets may be divided into variable-length data units for switching or switched intact as respective data units. A "data cell" or "cell" refers to a smallest block of data that is passed through the multi-stage switch fabric 12. The cell includes a header portion and a data portion. "Cell data" refers to data contained within a data portion of a cell. The header portion includes at least a source identifier indicating the source fabric endpoint of the cell and a sequence number. As used throughout this description unless specifically indicated otherwise, "cell" may refer to any unit of data switched by a multi-stage switch fabric.

The multi-stage switch fabric 12 offers multiple possible switch paths between each source fabric endpoint and a destination fabric endpoint to facilitate non-blocking switching. As a result of the differing latencies that individual cells may experience across the multiple paths that are available from a source fabric endpoint to a destination fabric endpoint, cells received at the destination fabric endpoint may arrive out of order relative to the sequence in which the cells were dispatched by the source fabric endpoint. The destination fabric endpoint therefore reorders the cells prior to processing in order to process the cells in the correct ordering. As noted above and to facilitate reordering, each cell includes a sequence number field. A fabric endpoint may receive a different stream of cells ("cell stream") from each fabric endpoint of network device, including at least in some cases from the fabric endpoint itself.

In accordance with techniques described herein, network device 4 performs scalable reordering of the various source fabric endpoint-to-destination fabric endpoint cell streams by separately reordering subsequences of a cell stream and interleaving reordered subsequences to reconstitute the cell stream as an ordered stream of cells. The techniques may increase the reordering rate of each fabric endpoint to meet the switch fabric 12 throughput for each cell stream received by the fabric endpoint.

Figure 2:
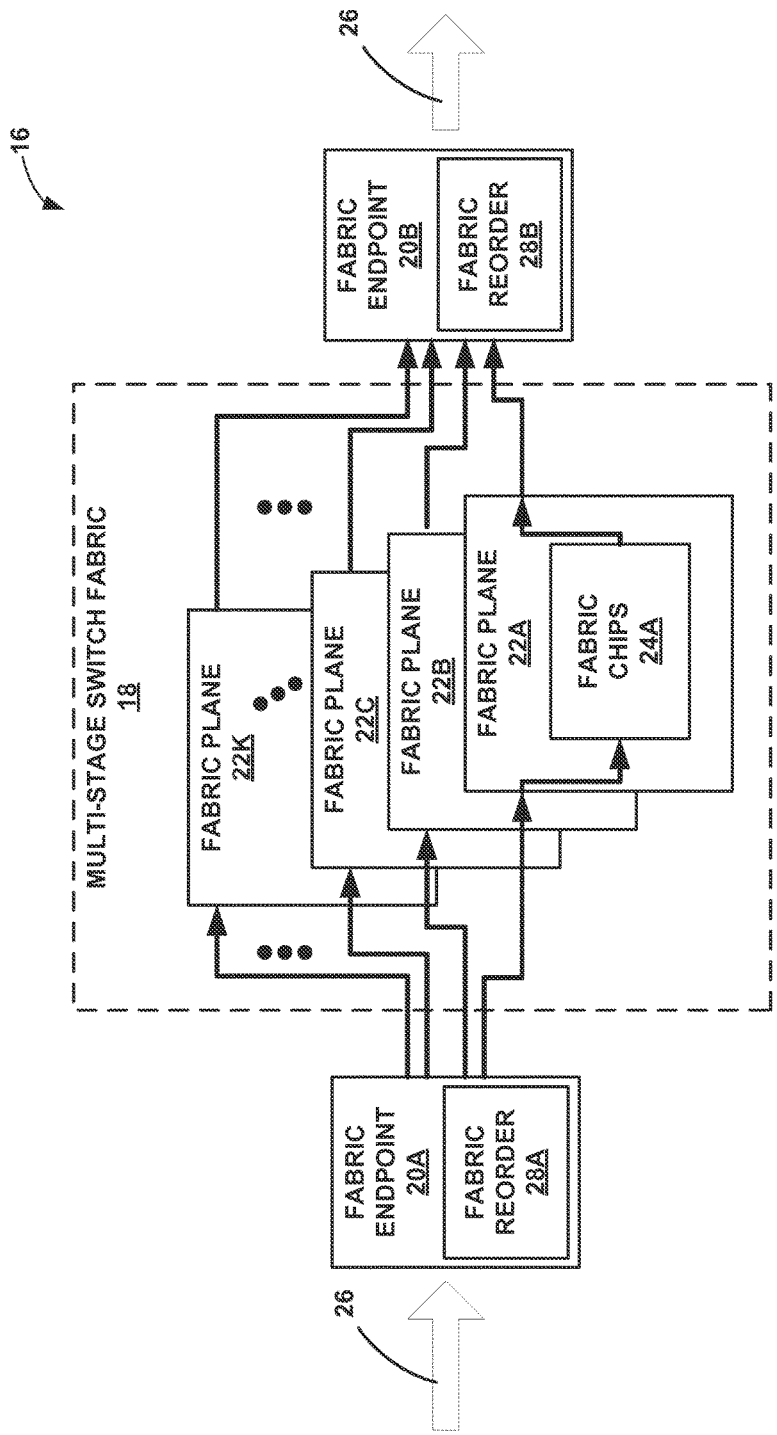
FIG. 2 is a block diagram illustrating an example of a switching system according to techniques described herein.

FIG. 2 is a block diagram illustrating an example of a switching system according to techniques described herein. Multi-stage switch fabric 18 ("fabric 18") of switching system 16 may represent an example instance of multi-stage switch fabric 12 of the network device 4 of FIG. 1. Fabric endpoints 20A, 20B (collectively, "fabric endpoints 20") of switching system 16 and separately coupled to each of fabric planes 22A-22K of multi-stage switch fabric 18 operate as sources and/or destinations of data units (e.g., cells) switched by fabric 18. In the illustrated example, fabric endpoint 20A sends, ingresses, originates, or otherwise sources packets 26 for switching via multi-stage switch fabric 18 to fabric endpoint 20B that receives, egresses, consumes, or otherwise sinks packets 26. Although FIG. 2 illustrates only two fabric endpoints, switching system 16 may include many hundreds of fabric endpoints, or more. In some examples, switching system 16 includes 96 fabric endpoints in communication with multi-stage switch fabric 18. In such examples, any given fabric endpoint 20 may receive cells for cell streams sourced by 96 different fabric endpoints 20.

Although each of fabric endpoints 20 typically operates as both a source and a destination for cells, any of fabric endpoints 20 may be either a source or a destination for cells in various instances. In some examples, fabric endpoints 20 may each represent a packet forwarding engine or other forwarding unit such that fabric endpoints 20 collectively implement a distributed forwarding plane for a packet switching device (e.g., network device 4). In some examples, fabric endpoints 20 may represent fabric interfaces for servers or other hosts (e.g., virtual machines) that exchange packets for a distributed application via fabric 18. Fabric endpoints 20 may include respective switch fabric interfaces or "switch interfaces" (SIs—not shown) to provide queuing for cells being switched via fabric 18, among other operations.

In this example, multi-stage switch fabric 18 includes a plurality of operationally independent, parallel switch fabric planes 22A-22K (illustrated as "fabric planes 22A-22K" and referred to herein collectively as "fabric planes 22"). The number of fabric planes 22 may be any number, dependent upon the respective capacities of the fabric planes 22 and the fabric bandwidth needed. Fabric planes 22 may include 4, 5, or 18 planes, for instance. In some examples, fabric plane 22K operates as a backup or spare fabric plane to the remaining fabric planes 22. Each of fabric planes 22 includes similar components for implementing an independent Clos or other multi-stage switch network (e.g., a Benes network) to provide independent switching bandwidth to fabric endpoints 20, said components and functionality being described hereinafter primarily with respect to fabric plane 22A. Fabric planes 22 are operationally independent in that a failure of one of fabric planes 22 does not affect the switching ability of the remaining, operational fabric planes. Each of fabric planes 22 may provide non-blocking connectivity. Additional details regarding an example of a multi-stage switch fabric having a plurality of switch planes are found in Pradeep S. Sindhu, U.S. Pat. No. 7,102,999, entitled "Switching Device" and filed Nov. 24, 1999, which is incorporated by reference in its entirety.

Each of fabric planes 22 includes an input port coupled to fabric endpoint 20A and an output port coupled to fabric endpoint 20B. Although only one ingress fabric endpoint 20A and one egress fabric endpoint 20B is illustrated for simplicity, each fabric plane 22 typically includes multiple input ports and output ports coupled to respective fabric endpoints. When a fabric endpoint 20A obtains a packet, the fabric endpoint 20A performs a lookup operation to determine fabric endpoint 20B (in this example) is a destination for the packet. Obtaining a packet may refer to receiving a packet from the network or host, or originating a packet, for instance. Fabric endpoint 20A optionally divides the packet into cells and forwards the packet/cells across multi-stage fabric 18 to fabric endpoint 20B. Fabric endpoint 20A selects different fabric planes 22 to switch the cells to distribute the bandwidth load across the fabric planes 22.

Fabric endpoints 20A, 20B may employ a request/grant protocol to transmit a data cell across fabric 18. In such cases, source fabric endpoint 20A transmits a request across fabric 18 to the destination fabric endpoint 20B. Fabric endpoint 20A transmits each such request across a different one of fabric planes 22 in a round-robin or other balancing order to fairly distribute the transport load. In response to receiving the request, fabric endpoint 20B transmits a grant to the fabric endpoint 20A across the same fabric plane 22 on which fabric endpoint 20B received the corresponding request. In response to receiving the grant, fabric endpoint 20A transmits the data cell to the fabric endpoint 20B across the same fabric plane 22 on which fabric endpoint 20A issued the corresponding request.

As noted above, each of fabric planes 22 may include similar components to perform similar multi-stage switch functionality. Fabric plane 22A, as an example, includes a plurality of fabric chips 24 coupled by fabric chip-to-chip links (CCLs—not shown) to implement a multi-stage switch fabric for the fabric plane 22A. Fabric chips 24A may be distributed among various switching devices, chassis, etc., of the switching system 16. Each of fabric chips 24A may include an application-specific integrated circuit (ASIC) and may be referred to as a "fabric ASIC." Each fabric chip may perform the switching functionality for one or more stage switches and may represent, e.g., a crossbar switch.

In accordance with techniques described herein, fabric endpoints 20A-20B includes respective fabric reorder modules 28A-28B (illustrated as "fabric reorder" and collectively referred to as "fabric reorder modules 28") to reorder cells received from other fabric endpoints 20. For instance, fabric endpoint 20B operating as a destination fabric endpoint receives, from source fabric endpoint 20A, cells in a disordered sequence according to the sequence numbers of the cells and according to the times as which cells were sent by source fabric endpoint 20A, which incrementally increases the sequence number with each cell sent for the cell stream to a particular destination fabric endpoint (here, fabric endpoint 20B).

As described in further detail below, fabric reorder modules 28 each consist of multiple reorder engines to perform cell reordering on different subsequences of a cell stream, to detect missing or skipped cells, and to detect and facilitate robust recovery from other error conditions. Fabric reorder modules 28 may further include interfaces to upstream and downstream modules including respective queues/FIFOs or other data structure for buffering inbound cells and outbound cells, respectively.

Fabric reorder module 28B performs scalable reordering of the cell stream from fabric endpoint 20A to fabric endpoint 20B by separately reordering subsequences of the cell stream and interleaving reordered subsequences to reconstitute the cell stream as an ordered stream of cells. The term "subsequences" of the cell stream refers to a set of cells that is a distinct subset of cells from the original ordered stream of cells. A module of fabric endpoint 20B downstream from fabric reorder module 28B may then process the ordered stream of cells by, e.g., reconstituting the cells to packets 26 for packet processing by fabric endpoint 20B, which may include outputting the packets 26 via one or more outbound links in communication with the fabric endpoint 20B and coupled to one or more destination network devices for the packets 26.

Fabric endpoints 20 may send respective cells streams for the different request, grant, and data types of cells. Fabric reorder modules 28 may operate similarly with respect to each such cell stream from a given source fabric endpoint 20 to reorder the out-of-order cells according to the ordering of the sequence numbers of the cells. Fabric reorder modules 28 perform reordering based on the sequence numbering (SN) space of the cells.

Figure 3:
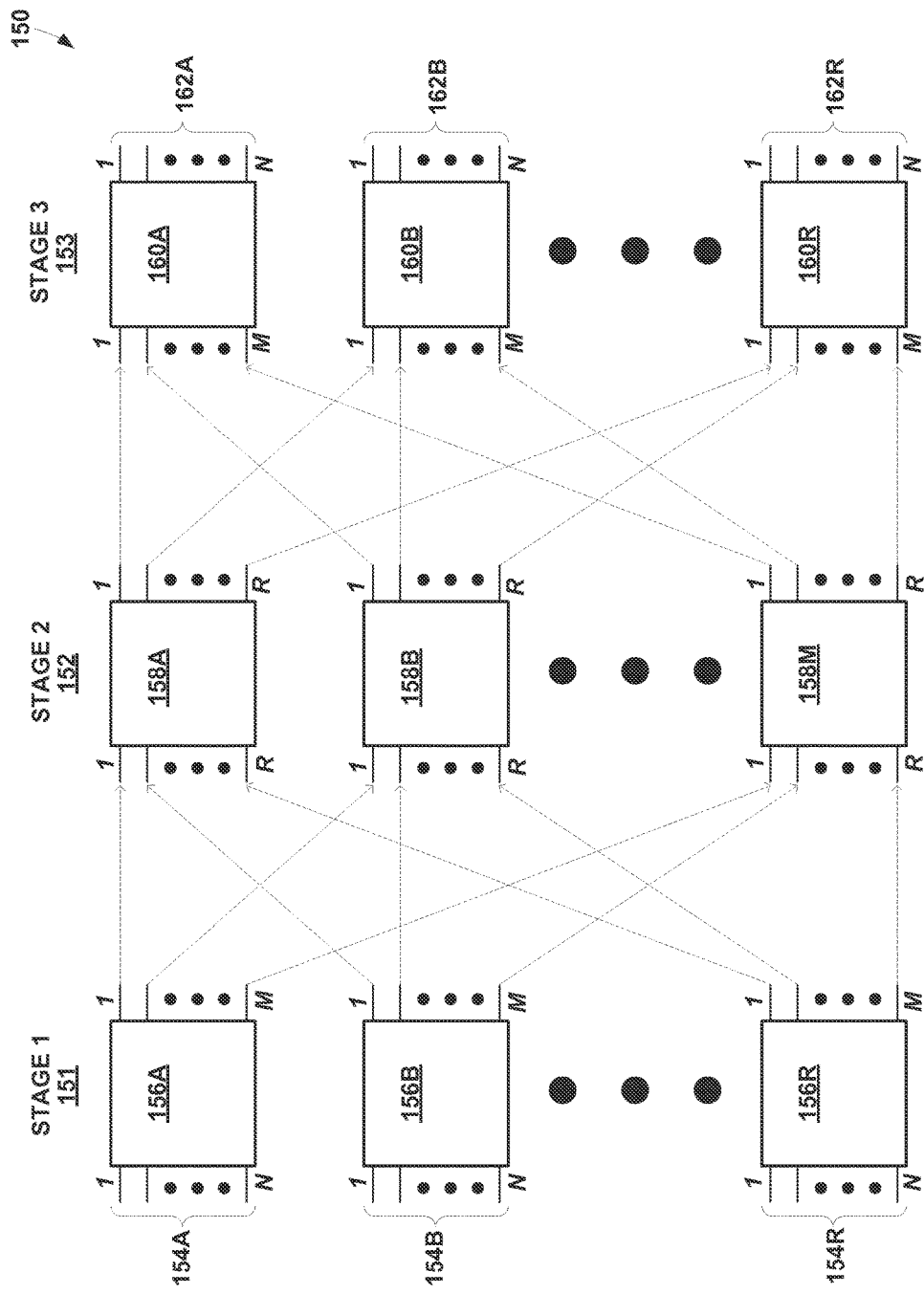
FIG. 3 is a block diagram illustrating a logical representation of a three-stage switching network that operates in accordance with techniques described herein.

FIG. 3 is a block diagram illustrating a logical representation of a three-stage switching network 150 (or "switch fabric 150") that operates in accordance with techniques described herein. Three-stage network 150 may logically represent switch fabric 12 of FIG. 1, switch fabric 18 of FIG. 2, or another switch fabric in which components or devices are interconnected to provide a multi-stage switch fabric. The three stages of the example network 150 of FIG. 3 include: stage 1 151 consisting of crossbar switches 156A-156R (collectively "switches 156"), stage 2 152 consisting of crossbar switches 158A-158M (collectively "switches 158"), and stage 3 consisting of crossbar switches 160A-160R (collectively "switches 160"). Switches 156 receive data packets via inputs 154A-154N (collectively "inputs 154"); there are a total of N×R inputs 154 in this example. Switches 160 send the data packets via output ports 162A-162N (collectively "outputs 162"); there are a total of N×R outputs 162 in this example.

As shown in FIG. 3, stage 1 151 and stage 3 153 each include R crossbar switches, while stage 2 152 includes M crossbar switches. Three-stage network in coupled to N inputs and N outputs, thus completing the characterization of the Clos network. The integer values for M and N define blocking characteristics of three-stage switching network 150. For example, stage 2 152 may include more crossbar switches than stage 1 151 and stage 3 153 (i.e., M>R) to reduce or eliminate the possibility that an open one of inputs 154 could be blocked from an open one of outputs 162.

Each of switches 156, 158, 160 may be implemented by a fabric chip. In some cases, corresponding stage 1 switches 156 and stage 3 switches 160 (e.g., switch 156A and switch 160A) may be implemented by a same fabric chip. As described with respect to multi-chassis router 150 of FIG. 3, stage 1 151 and stage 3 153 may be located in a plurality of LCCs, while stage 2 152 is located in an SCC.

To establish a path through network 150 from one of inputs 154 to the intended output 162, the one of switches 156 associated with the receiving input 154 determines an available stage 2 152 switch 158 that allows a connection path to the stage 3 153 switch 160 including the intended output 162. For example, assume a packet received by switch 156A is to be relayed to one of outputs 162A on switch 160A. Switch 156A selects any of switches 158 with an open connection to both switch 156A and switch 160A. Assume switch 156A selects switch 158B. Once switch 158B receives the data packet, switch 158B determines an available path to switch 160A and forwards the data packet to switch 160A. For example, switch 158B may have more than one open path to switch 160A. A source fabric endpoint may use different open paths from one of inputs 154 to the intended output 162 to switch consecutive cells (by sequence number), each open path having a different latency. As a result, fabric cells for the cell sequence from the source fabric endpoint may arrive out of order at the destination fabric endpoint.

While generally described as a three-stage switch network such as network 150, in other examples fabric planes described herein may contain different another type of switch architecture. For example, the second stage in a three-stage network may be replaced with another three-stage network, thereby forming a five-stage network.

Figure 4:
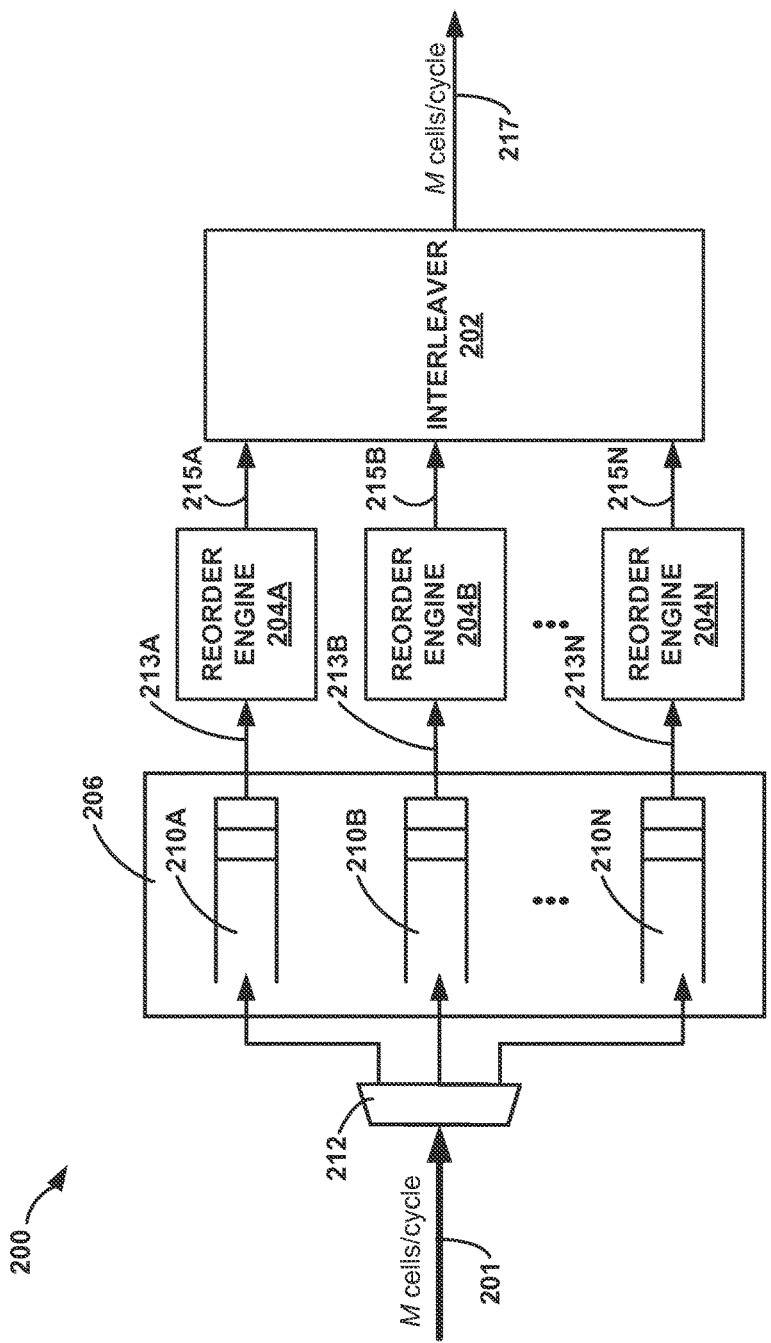
FIG. 4 is a block diagram illustrating an example fabric reorder module that includes multiple fabric reorder engines operating in parallel to reorder multiple cell streams according to techniques described in this disclosure.

FIG. 4 is a block diagram illustrating an example fabric reorder module that includes multiple fabric reorder engines operating in parallel to reorder multiple cell streams according to techniques described in this disclosure. Fabric reorder module 200 may represent an example of any of fabric reorder modules 28 of FIG. 2 or other fabric reorder module described herein. Fabric reorder module 200 receives cells from a multi-stage switch fabric in communication with fabric reorder module 200. The fabric endpoint that includes fabric reorder module 200 may include a fabric input interface (not shown) that mediates communication between the multi-stage switch fabric and fabric reorder module 200 to provide flow control to, e.g., ensure a maximum number M of fabric cells received at fabric reorder module 200 per clock cycle (i.e., a rate of M cells per cycle). Fabric reorder module 200 facilitates cell reordering at the maximum rate from which the cells can arrive from the fabric. That is, the fabric reorder module 200 attempts to process cell contexts and reorder the cells at the maximum rate at which fabric reorder module 200 receives the cells from the fabric. In some examples, fabric reorder module 200 may receive and reorder fabric cells at a rate of 2 cells per clock cycle, where the clock cycle may refer to a memory cycle. In some examples, fabric reorder module 200 may experience resource or processing congestion and throttle, via the fabric endpoint, the rate at which cells are received from the fabric.

Each cell received by fabric reorder module 200 from the multi-stage switch fabric is associated with a cell context. The cell context for a cell indicates a sequence number in the sequence space for fabric cells and also identifies the source fabric endpoint that transmitted the cell via the fabric to the destination fabric endpoint that includes fabric reorder module 200. The cell context may further include a data pointer to a location in memory, for a downstream module, to which the cell data is stored. At least a portion of the cell context for a cell may be included in the cell header.

As illustrated, fabric reorder module 200 receives inbound cells 201 at a rate of M cells/cycle. M may be represent the memory bandwidth of a memory device that stores cell data for the fabric endpoint that includes fabric reorder module 200 and therefore represent a maximum rate at which the fabric endpoint is able to process inbound cells 201. However, the number of inbound cells 201 received by fabric reorder module 200 in any particular cycle may be variable and not necessarily a constant M.

Subsequencer 212 divides inbound cells 201 into one of N subsequences 213A-213N (collectively, "subsequences 213") according to the sequence number of the corresponding cell context. Each subsequence of subsequences 213 represents a different portion of inbound cells 201. Each subsequence of subsequences 213 may include cells sourced by multiple different fabric endpoints. For example, subsequence 213A may include cells received by fabric reorder module 200 from multiple different fabric endpoints.

In some examples, subsequencer 212 assigns inbound cells 201 to subsequences 213 by a modulus operation such that every Nth cell, by sequence number, for a cell stream is assigned to the same subsequence. For example, subsequencer 212 may determine subsequences $S_0, S_1, S_2 \ldots S_N$ of sequence S by assigning different sequence numbers of the sequence number space to the subsequences as follows:

$S_0 = X_0, X_N, X_{2N} \ldots$
$S_1 = X_1, X_{N+1}, X_{2N+1} \ldots$
$S_2 = X_2, X_{N+2}, X_{2N+2} \ldots$
$\ldots$
$S_{N-1} = X_{N-1}, X_{N+N-1}, X_{2N+N-1} \ldots$ where i is the sequence number for cell $X_1$ in a cell sequence. N is the number of reorder engines and corresponding subsequences 213 ($S_0, S_1, \ldots, S_{N-1}$, respectively). More formally, for each cell stream from a different fabric endpoint, for all K=0:N, $S_K = X_K + X_{N+K} + \ldots + X_{iN+K}$, where $S_K$ is the Kth subsequence, N is the number of reorder engines 204A-204N, and i is determined according to the size of the sequence number space. However and explained in detail below, subsequences 213 may not arrive in the ordered sequence indicated above. Because the sequence number space is finite, the sequence number rolls over. In some examples, inbound cells 201 have a 12-bit, 15-bit, or other sequence number space. In some instances, subsequencer 212 may assign inbound cells 201 to subsequences 213 according to a bitstring of the sequence numbers that corresponds to a subsequences 213 space. For example, where N=4, subsequences 212 may assign inbound cells 201 to subsequences according to the 2-bit bitstring that are the lowest significant bits (or most significant bits or other bits) of the sequence numbers identified in the cell contexts for inbound cells 201.

Cells for a given cell stream, corresponding to a source fabric endpoint, that are assigned to a particular subsequence of subsequences 213 may arrive in any order due, e.g., to different latencies for different paths through switch fabric 12. In other words, cells sent by a fabric endpoint may not arrive at fabric reorder module 200 in the order in which the cells were sent by the fabric endpoint. As a result, each subsequence of subsequences 213 may represent cells incorrectly ordered by sequence number, per cell stream. Per the above examples, subsequences 213 may be as follows:

$S_0 = X_N, X_0, X_{2N} \ldots$
$S_1 = X_1, X_{N+1}, X_{2N+1} \ldots$
$S_2 = X_{N+2}, X_{2N+2}, X_0 \ldots$
$\ldots$
$S_{N-1} = X_{N-1}, X_{N+N-1}, X_{2N+N-1} \ldots$ Reorder engines 204A-204N (collectively, "reorder engines 204") reorder respective subsequences 213 to generate ordered subsequences 215A-215N with one or more ordered cell streams. Some examples of fabric reorder engine 200 include four reorder engines 204. Because reorder engine 204A is assigned the task of generating ordered subsequence 215A, for instance, reorder engine 204A need only produce ordered subsequence 215A at 1/$N^{th}$ the rate of a full speed reorder engine. The inbound cells 201 assigned to each of the reorder engines 204A may arrive at the max cell rate of M cells per cycle over short unsustainable bursts, but respective burst buffers 210A-210N reduce the rate to M/N at which the reorder engines 204 are to produced ordered subsequences 215, respectively.

Reorder engines 204 may apply various techniques to reorder respective subsequences 213. Reorder engines 204 may apply the reordering techniques to cell contexts representative of subsequences of inbound cells, the cell contexts identifying the sequence numbers, the source fabric endpoints, and pointers to cell data. Example techniques for reordering subsequences 213 are described in further detail below.

Reorder engines 204 generate respective ordered subsequences 215, per-cell stream for the various source fabric endpoints, that need to be interleaved to form a single stream of ordered cells 315 for each of the various cell streams from the source fabric endpoints. Interleaver 302 interleaves ordered subsequences 215 by sequentially adding the next ready cell, by sequence number, from the ordered subsequences 215. Per the above example, reorder engines 204 may generate ordered subsequences 215 for a cell stream S as follows:

$S_0 = X_0, X_N, X_{2N} \ldots$
$S_1 = X_1, X_{N+1}, X_{2N+1} \ldots$
$S_2 = X_2, X_{N+2}, X_{2N+2} \ldots$
$\ldots$
$S_{N-1} = X_{N-1}, X_{N+N-1}, X_{2N+N-1} \ldots$ Interleaver 302 interleaves the ordered subsequences 215 to generate a single ordered cell stream $S = X_0, X_1, X_3, \ldots, X_{NN-1}$ for processing by the fabric endpoint that includes fabric reorder module 200 as ordered cells 217. For example, the fabric endpoint may reconstitute the ordered cells 217 as one or more packets.

Figure 5:
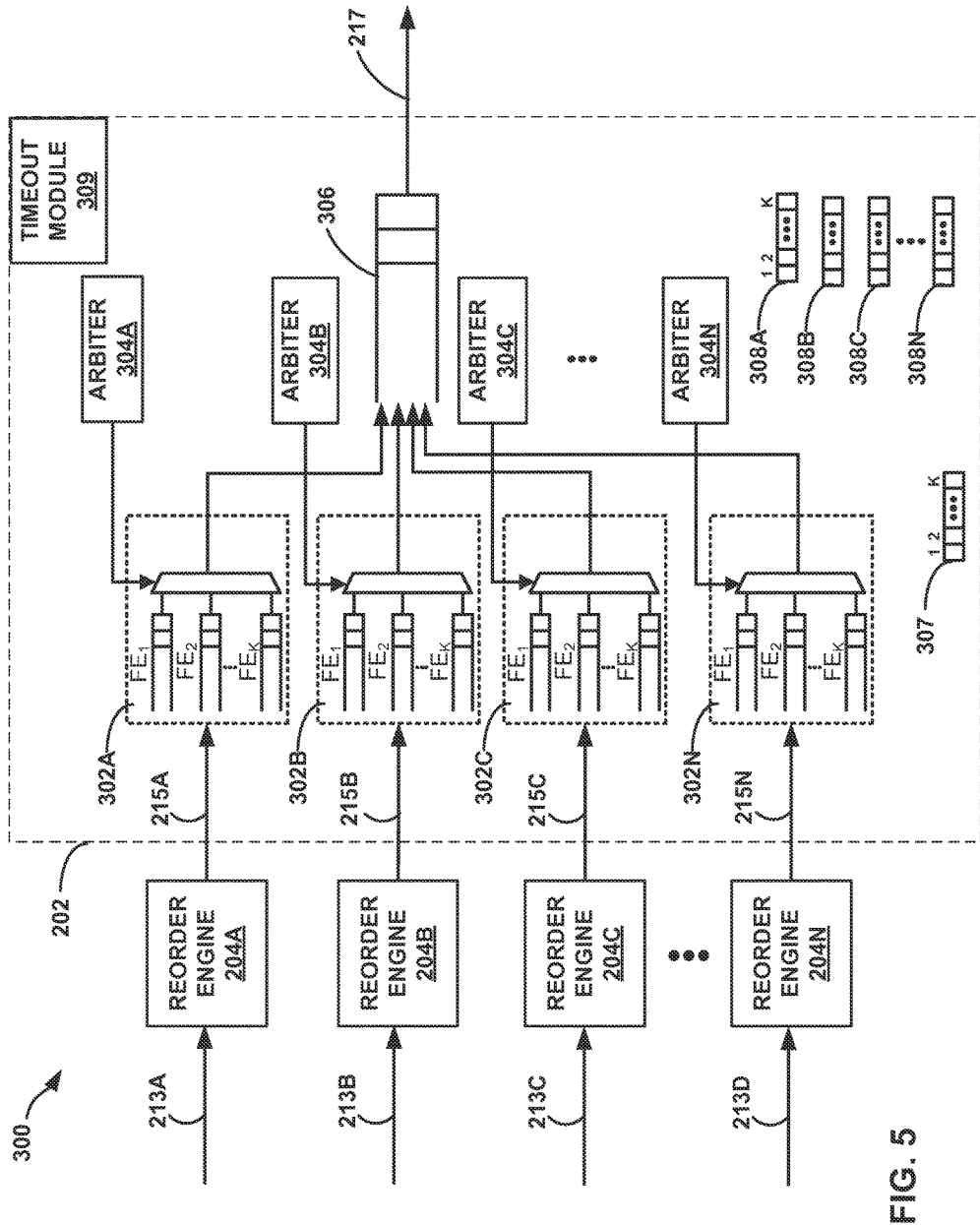
FIG. 5 is a block diagram illustrating, in detail, an example architecture for a fabric reorder module to reorder cell streams in accordance with techniques described in this disclosure.

FIG. 5 is a block diagram illustrating, in detail, an example architecture for a fabric reorder module to reorder cell streams in accordance with techniques described in this disclosure. Fabric reorder module 300 may represent an example instance of any of fabric reorder modules 200, 28, or other fabric reorder module described in this disclosure. For a given sequence for a cell stream, each of reorder engines 204 of fabric reorder module 300 generates an ordered stream of cell pointers that interleaver 202 interleaves to form a single cell stream.

Reorder engines 204 enqueue successfully reordered cells to per-source-fabric endpoint queues (or FIFOs) 302A-302N, which facilitates avoiding head-of-line blocking across the source fabric endpoints. Each reorder engine 204 is associated with a different set of queues 302, each set having K queues $FE_1$-$FE_K$, where K represents the number of fabric endpoints from which fabric reorder module receive input cells 201 divided into subsequences 213. Queues 302 for respective reorder engines 204 may be stored to separate memory structures/devices to enable concurrent read/writes by the reorder engines 204. Queues 302 may in some examples be circular FIFOs of fixed size to store memory pointers to cell metadata, with the FIFO occupancy counts and other FIFO control data managed by flops.

When reorder engine 204A, for example, reorders a cell in subsequence 213A such that the cell is the next expected cell in the order subsequence 215A, reorder engine 204A enqueues the cell to the queue from queues 302A that corresponds to the source fabric endpoint that sent the cell the destination fabric endpoint via the switch fabric 4. Reorder engines 204 in this way reorder cells from respective subsequences for each cell stream. Although referred to herein as enqueuing a "cell," the data enqueued may not include cell data and may instead include a pointer to the cell data and cell metadata describing the cell, such as sequence number and source fabric endpoint identifier.

In some examples, if a queue corresponding to fabric endpoint i and used by reorder engine 204B (for instance) is filled to capacity, reorder engine 204B flow-controls the cell stream i. The queues 302 in some examples have depth sufficient to cover the pipeline latency through the reorder engines 204. Because cells may arrive out of order, fabric endpoint queues from queues 302 for a given fabric endpoint will have varying sizes over time.

An enqueue transaction to enqueue a cell indicates that the cell is reordered among other cells in its subsequence and is ready for further processing from a downstream module of the fabric endpoint. As noted above, an enqueue transaction may enqueue the cell pointer and source fabric endpoint. The cell pointer may identify a memory location in a storage medium to which cell data is stored. In some examples, fabric reorder module 300 may store cell pointers to a database during reordering and send the cells pointer to a downstream module of the fabric endpoint with enqueue transactions.

Interleaver 202 uses a reorder data structure 307 to store the next sequence number expected for each cell stream from the various fabric endpoints. Reorder data structure 307 may include K sequence numbers, there being a sequence number value for each cell stream that identifies the next sequence number expected for the cell stream. Reorder data structure 304 may represents a table, for instance. Because the sequence numbers of subsequences 213 are evenly distributed among the N reorder engines 204, adjacent bits of the sequence number for a cell stream indicate the particular reorder engine 204 that is expected to deliver the next cell in the ordered cells stream. For example, where N=4, the two least significant bits (or most significant bits, or other bits) of the sequence number for cell stream 7 indicate the particular reorder engine 204 that is expected to deliver the next cell in the ordered cell stream for cell stream 7. For example, least significant bits "00" may indicate reorder engine 204A, "01" may indicate reorder engine 204B, and so forth.

The reorder engines 204 also enqueue the sequence number for each reordered cell to queues 302. The arbiters 304A-304N may verify that the sequence number of the cell from the next expected reorder engine 204 matches the expected sequence number indicated by reorder structure 307.

Interleaver 202 in the example of FIG. 5 also includes respective reorder ready data structures 308A-308N (collectively, and hereinafter "reorder ready vectors 308") for reorder engines 204. Each of reorder ready 308 may represent a vector or other table with a bit, flag, or other value for each fabric endpoint cell stream that indicates whether the next cell for the cell stream for the subsequence reordered by the corresponding reorder engine 204 is reordered and ready for further processing fabric endpoint. For example, reorder ready vector 308B corresponds to reorder engine 204B. The flag 7 of reorder ready vector 308B indicates whether the next cell from subsequence 213B for the cell stream from the fabric endpoint 7 is ready and enqueued to the $FE_7$ from queues 302B. In some examples, the network device include 96 endpoints and K=96. Reorder engines 204 set flags in respective reorder ready vectors 308 upon reordering and enqueuing next cells in respective subsequences 215.

If a value corresponding to a source fabric endpoint in one of reorder ready vectors 308 indicates the next cell from the subsequence for the cell stream from the source fabric endpoint is ready and the sequence number for the source fabric endpoint in the reorder structure 307 indicates the one of reorder engines 204 corresponding to the reorder ready vector is the next expected reorder engine, then the next cell for the overall cell stream is reordered and ready for downstream processing. For example, reorder structure 307 may have a value for fabric endpoint 7 that indicates reorder engine 204B is the next expected reorder engine for the cell stream from fabric endpoint 7. In other words, reorder structure 307 in this example indicates that all previous cells in the cell stream from fabric endpoint 7 have been sent or otherwise handled, but that the next cell in the cell stream from fabric endpoint 7 is included in subsequence 213B and is expected from reorder engine 204B. Further in this example, reorder engine 204B has reordered and enqueued the next cell in the cell stream from fabric endpoint 7 and set the value corresponding to fabric endpoint 7 in reorder ready vectors 308 to indicate the next cell from the subsequence 213B for the cell stream from the source fabric endpoint 7 is ready. This combination of data structure indications of reorder ready vectors 308 and reorder structure 307 indicate the next cell in the cell stream is ready for processing by a downstream module of the fabric endpoint that includes fabric reorder module 300.

Respective arbiters 304A-304N arbitrate independently across the reorder ready vectors 308 to select M cells out of at most N ready cells to satisfy the expected performance of M cell pointers every cycle. Arbiters 304 read the state of cell reordering per-source fabric endpoint, as indicated in reorder structure 307 and reorder ready vectors 308, to determine which (if any) sets of queues 302 have ready cells for downstream processing. Arbiters 304 arbitrate among themselves to determine which arbiters are permitted to process ready cells. In some examples, each of arbiters 304 analyzes its corresponding set of queues 302 in a round-robin fashion to promote fairness with regard to ordering the various cell streams for the K queues.

In some instances, if only one value in a reorder ready vector 308 indicates a ready cell (i.e., a single cell stream is active), then arbiters 304 may send the next cell for the same cell stream from the next reorder engine in the same cycle, if it is available. Arbiters 304 may determine an availability of a second ready cell for the same cell stream from the occupancy count of the corresponding queue 302 managed by the next reorder engine in the set of reorder engines 204.

After arbiters 304 make the arbitration decision to select M cells 306 (for one cycle), arbiters 304 update the reorder ready vectors 308, reorder data structure 307, and the state of queues 302 for use in the next cycle. In some situations reorder ready vectors 308 and reorder data structure 307 may indicate that the same reorder engine 204 has reordered multiple cells of the selected M cells 306. Because these multiple cells may all be stored to the same memory device, this may cause an a brief drop cell throughput as only one cell data can be ready/processed from the memory device during a given cycle. However, this situation will correct as during the next cycle at least two other reorder engines 204 will have ready cells.

Switch fabric 4 may be lossy and result in cells being dropped due to congestion or other factors. Because a given cell may not arrive within a reasonable time-frame, the cell should be affirmatively dropped by the fabric reorder module 300 to facilitate forward progress in processing the cell stream. Fabric reorder module 300 implements reorder pointer timeout techniques in order to handle dropped cells.

Because the architecture of fabric reorder module 300 has multiple independently-operating reorder engines 204 each responsible for reordering a subsequence of an overall cell stream, the reorder engines 204 only have access to the sequence number of cells in their corresponding subsequence 213. A single reorder engine, in other words, only sees 1/Nth of the sequence numbers for a cell stream received from the switch fabric. As a result, if the next expected cell in a cell stream for a reorder engine 204 is dropped in the fabric, the reorder engine may stall without generating any ready cells for the corresponding reordered subsequence 215, which itself causes interleaver 202 and the output to stall for that cell stream.

Rather than reorder engines 204 managing their own timeouts, interleaver 202, having system-wide visibility with respect to the expected sequence number for a cell stream, can timeout a reorder engine 204 if interleaver 202 has waited a prescribed time for the next cell in the cell stream. In other words, while interleaver 202 is waiting for a sequence number enqueue from a reorder engine 204A (for instance) as specified by reorder structure 207, if a future sequence number is available from a different reorder engine 204B (for instance), interleaver 202 sends a timeout trigger to the reorder engine 204A pointed to by the reorder structure 207 to start an internal timeout. Upon expiry, the internal timeout in the reorder engine 204A may generate a skip transaction for the sequence number expected by interleaver 202 for the cell stream, which causes the interleaver 202 to advance the sequence number for the cell stream in reorder structure 207, effectively skipping the missing cell. In some cases, reorder engine 204A in this example may enqueue the skip transaction to the corresponding queue from queues 302A for the cell stream. Arbiter 304A or other logic of interleaver 202 may inspect the queue to identify the skip transaction and advance the sequence number. A skip transaction may identify the relevant source fabric endpoint to identify the cell stream and further may include a skip count that specifies the number of cells skipped.

In the example of FIG. 5, timeout module 309 of interleaver 202 manages timeouts and issues the timeout triggers to reorder engines 204. For example, timeout module 309 may review state for the various cells stream as represented in reorder structure 207 and/or reorder ready vectors 308 to determine whether a timeout trigger to a reorder engine 204 is warranted. A timeout trigger to a reorder engine 204 may include the sequence number expected to be timed out so as to avoid a race condition that may otherwise occur if the cell expected to be timed out is received at the reorder engine before the order engine receives the timeout trigger, which could cause the reorder engine to improperly time out the next cell in the sequence instead. Instead, the reorder engine 204 may ignore a timeout trigger if the included sequence number has already been received by the reorder engine.

Figure 6:
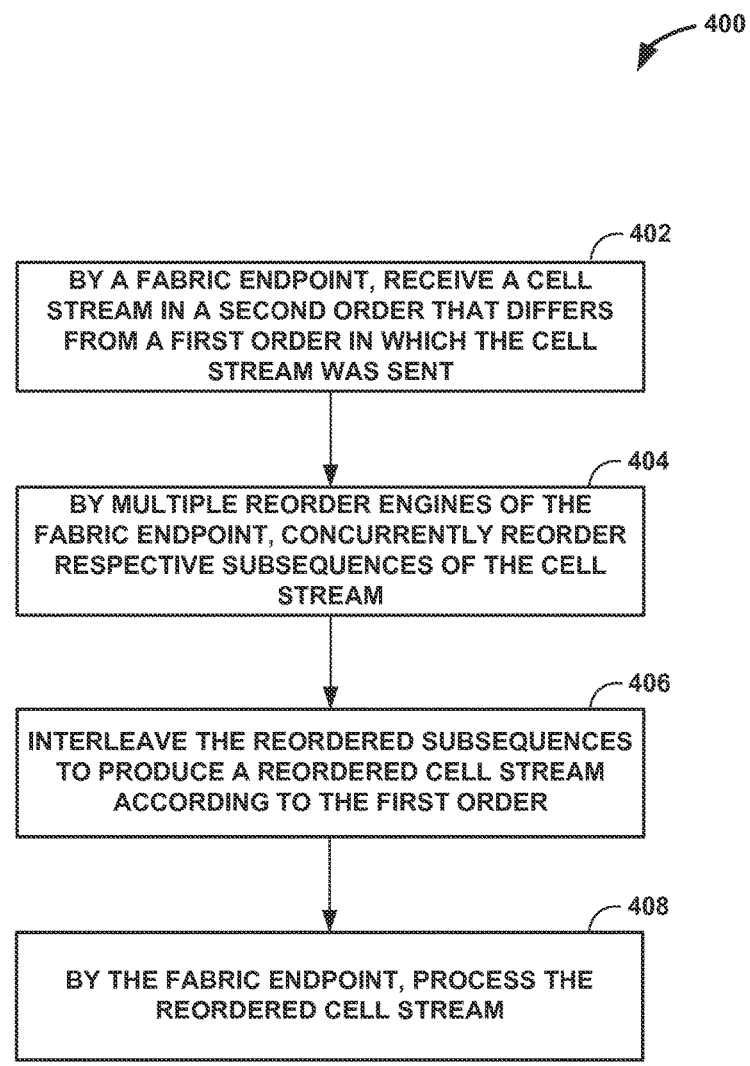
FIG. 6 is a flowchart illustrating an example mode of operation for a fabric endpoint according to techniques described in this disclosure.

FIG. 6 is a flowchart illustrating an example mode of operation for a fabric endpoint according to techniques described in this disclosure. Mode of operation 600 is described with respect to fabric endpoint 20B but may be applied by any of the fabric endpoints described herein. Fabric endpoint 20B receives a cell stream from fabric endpoint 20A via multi-stage switch fabric 18, the cell stream including multiple cells that arrive in a second ordering that is different from the first ordering in which fabric endpoint 20A sent the cells (402).

Fabric endpoint 20B assigns subsequences of the cell stream to respective reorder engines each responsible for reordering one of the subsequences such that the reordered subsequence is ordered according to the order in which the cells of the cell stream were sent by fabric endpoint 20A (404). Fabric endpoint 20B may then interleave cells of the reordered subsequences by determining, in turn, whether the next expected cell in the cell stream is received and reordered (and therefore ready) by the reorder engine responsible for reordering that next expected cell (406). Fabric endpoint 20B then processes the interleaved cells according to the order in which the cells were sent by fabric endpoint 20A (408).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of reordering cells switched by a multi-stage switch fabric having a plurality of stages to switch cells between any of a plurality of fabric endpoints, the method comprising:

receiving, by a fabric endpoint of the plurality of fabric endpoints and via the switch fabric, a plurality of cell streams, wherein each cell of a cell stream of the plurality of cell streams is associated with a sequence number that defines a correct ordering of cells of the cell stream;

assigning, by the fabric endpoint, different subsequences of each cell stream of the plurality of cell streams to different, respective reorder engines of the fabric endpoint;

concurrently reordering, by the reorder engines, the assigned respective subsequences to produce respective ordered subsequences for the subsequences, wherein the ordered subsequences are ordered according to the correct ordering of the corresponding cell stream;

interleaving, by the fabric endpoint, the respective ordered subsequences for each cell stream to produce reordered cell streams each having correctly ordered cells; and processing, by the fabric endpoint, each reordered cell stream according to the corresponding correct ordering of cells.

2. The method of claim 1, wherein each reorder engine of the reorder engines is associated with a set of queues, each queue of the set of queues for a reorder engine corresponding to a different cell stream of the plurality of cell streams, wherein the reorder engines are associated with reorder ready vectors, wherein a reorder ready vector associated with a reorder engine includes respective values for the set of queues associated with the reorder engine, each value for a queue indicating whether the next expected cell for the cell stream corresponding to the queue is reordered and ready for processing, wherein interleaving the ordered subsequences comprises reading, by the fabric endpoint, the reorder ready vectors to determine whether a next expected cell for a cell stream is reordered and ready for processing.

3. The method of claim 2, further comprising:

storing, by the fabric endpoint, a sequence number for the next expected cell for a cell stream of the plurality of cell streams according to the correct ordering for the cell stream; and determining, by the fabric endpoint based on the sequence number, a reorder engine of the reorder engines assigned the subsequence that includes the next expected cell, wherein interleaving the ordered subsequences comprises determining, by the fabric endpoint based on the reorder ready vector associated with the reorder engine and a value of the reorder ready vector for a queue corresponding to the cell stream, the next expected cell for the cell stream has been reordered by the reorder engine.

4. A method of reordering data units switched by a multi-stage switch fabric having a plurality of stages to switch data units between any of a plurality of fabric endpoints, the method comprising:

sending, by a first fabric endpoint of the plurality of fabric endpoints to a second fabric endpoint of the plurality of fabric endpoints and via the switch fabric, a plurality of data units in a first order;

receiving, by the second fabric endpoint, the plurality of data units in a second order, the second order different than the first order;

separately reordering, by the second fabric endpoint, a plurality of subsequences of the plurality of data units, each subsequence of the plurality of subsequences including a different subsequence of the data units according to the second order, to produce respective ordered subsequences each ordered according to the first order; and interleaving, by the second fabric endpoint, the ordered subsequences to process the plurality of data units in the first order.

5. The method of claim 4, further comprising:

assigning, by the second fabric endpoint, every Nth data unit of the data units in the first order to a subsequence of the plurality of subsequences, wherein N is a number of the plurality of subsequences, wherein separately reordering the plurality of subsequences comprises ordering, by the second fabric endpoint, the subsequence assigned every Nth data unit of the data units to produce the ordered subsequence corresponding to the sequence and ordered according to the first order.

6. The method of claim 4, further comprising:

assigning, by the second fabric endpoint, the plurality of subsequences to respective reorder engines of the second fabric endpoint, wherein separately reordering the plurality of subsequences comprises concurrently reordering, by the reorder engines, the subsequences assigned to the reorder engines to produce respective ordered subsequences each ordered according to the first order.

7. The method of claim 6, wherein interleaving the ordered subsequences comprises determining, by the second fabric endpoint, that a next expected data unit in a subsequence of the plurality of subsequences has been reordered by a reorder engine of the reorder engines assigned the subsequence, the method further comprising:

processing, by the second fabric endpoint in response IQ the determining, the next expected data unit in the subsequence prior to processing any other unprocessed data unit of the plurality of data units.

8. The method of claim 6, wherein the plurality of data units comprise respective sequence numbers that indicate the first order, and wherein interleaving the ordered subsequences comprises:

storing, by the second fabric endpoint, a next expected sequence number according to the first order; and determining, by the second fabric endpoint based on the next expected sequence number, a reorder engine of the reorder engines assigned the subsequence that includes a next expected data unit comprising a sequence number matching the next expected sequence number, the method further comprising:

processing, by the second fabric endpoint in response to determining the next expected data unit has been reordered by the reorder engine, the next expected data unit in the subsequence.

9. The method of claim 6, further comprising:

determining, by the second fabric endpoint, a second data unit of the plurality of data units has been received by a second reorder engine of the reorder engines assigned the second data unit and a first data unit of the plurality of data units has not been received by a first reorder engine of the reorder engines assigned the first data unit, the second data unit subsequent to the first data unit according to the first order;

issuing, by the second fabric endpoint in response to determining the second data unit has been received by the second reorder engine and the first data has not been received by the first reorder engine, a timeout trigger to the first reorder engine to cause the first reorder engine to wait a pre-defined timeout time to receive the first data unit before directing the second fabric endpoint to skip the first data unit.

10. The method of claim 9,
wherein the plurality of data units comprise respective sequence numbers that indicate the first order, and
wherein the timeout trigger comprises a sequence number for the first data unit, the method further comprising:
waiting, by the first reorder engine in response to comparing the sequence number of the timeout trigger to data units received by the first reorder engine, the pre-defined timeout time only if the first reorder engine has not received the first data unit when the first reorder engine receives the timeout trigger.

11. The method of claim 4,
wherein the plurality of data units comprises a first plurality of data units,
wherein the plurality of subsequences comprises a first plurality of subsequences, and
wherein the ordered subsequences comprise first ordered subsequences, the method further comprising:
sending, by a third fabric endpoint of the plurality of fabric endpoints to the second fabric endpoint of the plurality of fabric endpoints and via the switch fabric, a second plurality of data units in a third order;
receiving, by the second fabric endpoint, the second plurality of data units in a fourth order that is different than the third order;
separately reordering, by the second fabric endpoint, a second plurality of subsequences of the second plurality of data units, each subsequence of the second plurality of subsequences including a different subsequence of the second plurality of data units according to the fourth order, to produce respective second ordered subsequences each ordered according to the third order; and
interleaving, by the second fabric endpoint, the second ordered subsequences to process the second plurality of data units in the third order.

12. The method of claim 4, wherein each data unit of the plurality of data unit comprises a fabric cell.

13. A switching system comprising:
a plurality of fabric endpoints; and
a multi-stage switching fabric having at least one fabric plane each having a plurality of stages to switch cells between any of the plurality of fabric endpoints,
wherein a fabric endpoint of the fabric endpoints is configured to:
receive, via the switch fabric, a plurality of cell streams, wherein each cell of a cell stream of the plurality of cell streams is associated with a sequence number that defines a correct ordering of cells of the cell stream;
assign, by the fabric endpoint, different subsequences of each cell stream of the plurality of cell streams to different, respective reorder engines of the fabric endpoint, the reorder engines configured to concurrently reorder the assigned respective subsequences to produce respective ordered subsequences for the subsequences, wherein the ordered subsequences are ordered according to the correct ordering of the corresponding cell stream;
interleave the respective ordered subsequences for each cell stream to produce reordered cell streams each having correctly ordered cells; and
process each reordered cell stream according to the corresponding correct ordering of cells.

14. The switching system of claim 13,
wherein each reorder engine of the reorder engines comprises a set of queues, each queue of the set of queues for a reorder engine corresponding to a different cell stream of the plurality of cell streams,
wherein the reorder engines are associated with reorder ready vectors, wherein a reorder ready vector associated with a reorder engine includes respective values for the set of queues associated with the reorder engine, each value for a queue indicating whether the next expected cell for the cell stream corresponding to the queue is reordered and ready for processing,
wherein to interleave the ordered subsequences, the fabric endpoint is configured to determine, based at least on the reorder ready vectors, whether a next expected cell for a cell stream is reordered and ready for processing.

15. The switching system of claim 14, wherein the fabric endpoint is further configured to:
store a sequence number for the next expected cell for a cell stream of the plurality of cell streams according to the correct ordering for the cell stream; and
determine, based on the sequence number, a reorder engine of the reorder engines assigned the subsequence that includes the next expected cell,
wherein to interleave the ordered subsequences the fabric endpoint is further configured to determine, based on the reorder ready vector associated with the reorder engine and a value of the reorder ready vector for a queue corresponding to the cell stream, the next expected cell for the cell stream has been reordered by the reorder engine.

16. A switching system comprising:
a plurality of fabric endpoints; and
a multi-stage switching fabric having at least one fabric plane each having a plurality of stages to switch data units between any of the plurality of fabric endpoints,
wherein a first fabric endpoint of the fabric endpoints is configured to send, to a second fabric endpoint of the plurality of fabric endpoints and via the switch fabric, a plurality of data units in a first order,
wherein the second fabric endpoint is configured to:
receive the plurality of data units in a second order, the second order different than the first order;
separately reorder a plurality of subsequences of the plurality of data units, each subsequence of the plurality of subsequences including a different subsequence of the data units according to the second order, to produce respective ordered subsequences each ordered according to the first order; and
interleave the ordered subsequences to process the plurality of data units in the first order.

17. The switching system of claim 16,
wherein the second fabric endpoint is further configured to assign every Nth data unit of the data units in the first order to a subsequence of the plurality of subsequences, wherein N is a number of the plurality of subsequences, wherein to separately reorder the plurality of subsequences the second fabric endpoint is configured to order the subsequence assigned every Nth data unit of the data units to produce the ordered subsequence corresponding to the sequence and ordered according to the first order.

18. The switching system of claim 17,
wherein the second fabric endpoint comprises a plurality of reorder engines,
wherein the second fabric endpoint is configured to assign the plurality of subsequences to respective reorder engines of the plurality of reorder engines,
wherein to separately reorder the plurality of subsequences the reorder engines are configured to concurrently reorder the subsequences assigned to the reorder engines to produce respective ordered subsequences each ordered according to the first order.

19. The switching system of claim 18,
wherein to interleave the ordered subsequences the second fabric endpoint is configured to determine that a next expected data unit in a subsequence of the plurality of subsequences has been reordered by a reorder engine of the reorder engines assigned the subsequence,
wherein the second fabric endpoint is further configured to process, in response to the determining, the next expected data unit in the subsequence prior to processing any other unprocessed data unit of the plurality of data units.

20. The switching system of claim 18,
wherein the plurality of data units comprise respective sequence numbers that indicate the first order, and
wherein to interleave the ordered subsequences the second fabric endpoint is configured to:
store a next expected sequence number according to the first order; and
determine, based on the next expected sequence number, a reorder engine of the reorder engines assigned the subsequence that includes a next expected data unit comprising a sequence number matching the next expected sequence number,
wherein the second fabric endpoint is further configured to process, in response to determining the next expected data unit has been reordered by the reorder engine, the next expected data unit in the subsequence.

21. The switching system of claim 18, wherein the second fabric endpoint is further configured to:
determine a second data unit of the plurality of data units has been received by a second reorder engine of the reorder engines assigned the second data unit and a first data unit of the plurality of data units has not been received by a first reorder engine of the reorder engines assigned the first data unit, the second data unit subsequent to the first data unit according to the first order;
issue, in response to determining the second data unit has been received by the second reorder engine and the first data has not been received by the first reorder engine, a timeout trigger to the first reorder engine to cause the first reorder engine to wait a pre-defined timeout time to receive the first data unit before directing the second fabric endpoint to skip the first data unit.

22. The switching system of claim 21,
wherein the plurality of data units comprise respective sequence numbers that indicate the first order, and
wherein the timeout trigger comprises a sequence number for the first data unit,
wherein the first reorder engine is configured to wait, in response to comparing the sequence number of the timeout trigger to data units received by the first reorder engine, the pre-defined timeout time only if the first reorder engine has not received the first data unit when the first reorder engine receives the timeout trigger.

23. The switching system of claim 16,
wherein the plurality of data units comprises a first plurality of data units,
wherein the plurality of subsequences comprises a first plurality of subsequences, and
wherein the ordered subsequences comprise first ordered subsequences,
wherein a third fabric endpoint of the plurality of fabric endpoints is configured to send, to the second fabric endpoint of the plurality of fabric endpoints and via the switch fabric, a second plurality of data units in a third order,
wherein the second fabric endpoint is configured to:
receive the second plurality of data units in a fourth order that is different than the third order;
separately reorder a second plurality of subsequences of the second plurality of data units, each subsequence of the second plurality of subsequences including a different subsequence of the second plurality of data units according to the fourth order, to produce respective second ordered subsequences each ordered according to the third order; and
interleave the second ordered subsequences to process the second plurality of data units in the third order.

24. The switching system of claim 16, wherein each data unit of the plurality of data unit comprises a fabric cell.

25. A non-transitory computer-readable medium comprising instructions for causing at least one programmable processor of a fabric endpoint of a plurality of fabric endpoints that are coupled to a multi-stage switch fabric, to:
receive, via the switch fabric, a plurality of cell streams, wherein each cell of a cell stream of the plurality of cell streams is associated with a sequence number that defines a correct ordering of cells of the cell stream;
assign different subsequences of each cell stream of the plurality of cell streams to different, respective reorder engines of the fabric endpoint;
concurrently reorder the assigned respective subsequences to produce respective ordered subsequences for the subsequences, wherein the ordered subsequences are ordered according to the correct ordering of the corresponding cell stream;
interleave the respective ordered subsequences for each cell stream to produce reordered cell streams each having correctly ordered cells; and
process each reordered cell stream according to the corresponding correct ordering of cells.

26. A non-transitory computer-readable medium comprising instructions for causing at least one programmable processor of a first fabric endpoint of a plurality of fabric endpoints that are coupled to a multi-stage switch fabric, to:
send, to a second fabric endpoint of the plurality of fabric endpoints and via the switch fabric, a plurality of data units in a first order;
receive the plurality of data units in a second order, the second order different than the first order;
separately reorder a plurality of subsequences of the plurality of data units, each subsequence of the plurality of subsequences including a different subsequence of the data units according to the second order, to produce respective ordered subsequences each ordered according to the first order; and interleave the ordered subsequences to process the plurality of data units in the first order.

* * * * *

UNITED STATES PATENT AND TRADEMARK OFFICE
CERTIFICATE OF CORRECTION

PATENT NO.         : 10,164,906 B1
APPLICATION NO.    : 14/871669
DATED              : December 25, 2018
INVENTOR(S)        : Rohit Sunkam Ramanujam et al.

It is certified that error appears in the above-identified patent and that said Letters Patent is hereby corrected as shown below:

In the Claims

Column 18, Line 44 (Claim 7): Replace "response IQ" with --response to--

Signed and Sealed this
Seventeenth Day of March, 2020

Andrei Iancu
*Director of the United States Patent and Trademark Office*